United States Patent [19]

Boucot et al.

[11] Patent Number: 5,733,514
[45] Date of Patent: Mar. 31, 1998

[54] PROCESS AND DEVICE FOR MANUFACTURING SYNTHESIS GAS AND APPLICATION

[75] Inventors: Pierre Boucot, Ternay; Paul Gateau, Saint Jean de Boiseau; Michel Maute, Les Clayes Sous Bois; Philippe Courty, Houilles; Jërome Weill, Lyons, all of France

[73] Assignee: Institut Francais du Petrole, Rueil Malmaison, France

[21] Appl. No.: 782,496

[22] Filed: Jan. 10, 1997

Related U.S. Application Data

[62] Division of Ser. No. 382,587, Feb. 2, 1995, Pat. No. 5,632,787, which is a continuation of Ser. No. 915,232, Jul. 20, 1992, abandoned.

[30] Foreign Application Priority Data

Jul. 18, 1991 [FR] France .................. 91/09.214

[51] Int. Cl.⁶ ........................................ C01B 3/24
[52] U.S. Cl. ................ 422/189; 48/61; 48/198.1; 422/187; 422/188; 422/238
[58] Field of Search .................. 422/187, 188, 422/189, 190, 197, 238; 48/61, 198.7, 212, 215, 198.1

[56] References Cited

U.S. PATENT DOCUMENTS

| | | | |
|---|---|---|---|
| 2,635,952 | 4/1953 | D'Ouville | 48/198.7 |
| 2,767,233 | 10/1956 | Mullen et al. | 48/215 |
| 2,942,958 | 6/1960 | Dwyer | 48/198.7 |
| 2,943,062 | 6/1960 | Moder | 48/127.7 |
| 4,973,453 | 11/1990 | Ogie | 48/198.7 |

FOREIGN PATENT DOCUMENTS 2638443  5/1990  France .

*Primary Examiner*—Timothy McMahon
*Attorney, Agent, or Firm*—Antonelli, Terry, Stout, & Kraus, LLP

[57] ABSTRACT

The present invention relates to a process and a device for manufacturing synthesis gas.

The reactor according to the invention comprises within a single housing:

A non catalytic combustion chamber (1) comprising at least one device (2) for injecting a fuel and at least one device (3) for injecting an oxidizer so as to achieve a partial combustion in said chamber, and at least one catalytic bed (4) which the gases coming from combustion chamber (1) run into, and also comprising at least one device (6) for injecting an additional oxidizer.

The reactor and the process according to the invention may be applied to any chemical manufacturing utilizing synthesis gas, such as the manufacturing of ammonia, urea, methanol, higher hydrocarbons, etc.

9 Claims, 1 Drawing Sheet

PROCESS AND DEVICE FOR MANUFACTURING SYNTHESIS GAS AND APPLICATION

This application is a Divisional application of application Ser. No. 382,587filed Feb. 2, 1995 now U.S. Pat. No. 5,632,787, which application is a Continuation application of application Ser. No. 915,232, filed Jul. 20, 1992 (now abandoned).

BACKGROUND OF THE INVENTION

The present invention relates to a process and a device for manufacturing synthesis gas usable for producing for example ammonia, methanol, urea, hydrocarbons, etc.

The gases obtained according to the invention may be converted and then possibly purified or else be used as reducing gases.

It is well-known that synthesis gas is obtained by the reaction of a mixture of hydrocarbons or fuel with an oxidant.

A first way of producing synthesis gas consists in associating a primary reforming with a secondary reforming. The primary reforming reactor conventionally consists of pipes filled with catalyst and heated either through an external combustion or through heat exchange with warm effluents, for example with those of the secondary reforming reactor. The hydrocarbon is generally introduced into the primary reforming reactor with a large steam excess.

The primary reforming effluents are then introduced into the secondary reformer which also receives an oxidant supply.

U.S. Pat. No. 3,278,452 describes a secondary reformer whose improvement consists of an additional introduction of oxidant between the catalytic beds arranged successively in this reactor. However, the improvement provided by the stepped lay-out of the oxidant does not solve the major drawback of this type of reactors which requires a high amount of steam whose production is costly. Moreover, steam excess presents the disadvantage of changing the distribution between the hydrogen, the carbon dioxide and the carbon monoxide present in the synthesis gas.

Another way of manufacturing synthesis gas, with a low steam consumption, consists in performing a partial oxidation of the hydrocarbons.

U.S. Pat. No. 4,699,631 describes such an example of a reactor working without a catalyst, by means of a flame. However, this type of reactor always produces a certain proportion of soot because of the combustion under lack of oxygen, which requires afterwards a costly cleaning. Besides, if the amount of soot is wanted to be reduced, the oxygen consumption has to be raised, which decreases the reactor efficiency. Thus, although working with little steam, this type of reactor has the drawback of the formation of soots when the oxygen consumption is reduced or when working in air.

Document FR-2,638,443 describes another process for producing synthesis gas by means of a flame, with the partial oxidation of light hydrocarbons.

SUMMARY OF THE INVENTION

One object of the present invention is to propose a synthesis gas reactor and the associated process which require little steam and besides produce little soot.

The invention thus relates to a reactor for manufacturing synthesis gas, comprising within a single housing:

a non catalytic combustion chamber comprising at least one device for injecting fuel and at least one device for injecting an oxidizer so as to achieve a partial combustion in said chamber, and at least one catalytic bed which the gases coming from the combustion chamber run into, and also comprising at least one device for injecting additional oxidizer.

More particularly, the combustion chamber is such that:

$$V < 0.4 D/P$$

V being the inner volume of said chamber expressed in $m^3$

D being the overall weight flow entering the chamber and expressed in kg/s, and

P being the pressure prevailing inside the chamber, expressed in megapascals.

It has been quite unexpectedly observed that the dimensioning resulting from this limit allows the steam requirement to be reduced. Volume V defined thereby is besides remarkably low, compared to the volume of the combustion chambers of conventional authotermic reactors and of partial oxidation reactors. This substantial volume decrease allows the cost of the reactor to be reduced.

The fuel introduced in the combustion chamber and in the catalytic bed preferably consists essentially of hydrocarbons which may be admixed with carbon oxides and/or hydrogen.

The oxidizer may be pure oxygen, or oxygen admixed with nitrogen, steam, carbon dioxide. The oxidizer may also be a mixture of oxygen and another inert gas.

The hydrogen/hydrocarbons ratio, defined as the molar ratio expressed in number of moles of hydrogen to the number of moles of carbon of the fuel introduced in the combustion chamber, is advantageously less than 1.

Moreover, steam may be introduced with the oxidizer and/or the fuel.

The fuel may be preheated, before entering the combustion chamber, between 100° and 850° C., preferably between 600° and 700° C. The oxidant may be heated at each inlet between 100° and 900° C., preferably between 135° and 750° C. The upper limit of this range (750° C.) may be lowered to 600° C., notably in case the oxidant is oxygen or essentially pure oxygen.

The invention also relates to the process for manufacturing synthesis gas and which consists in achieving within a single reactor:

the partial conversion of a fuel in a non catalytic combustion chamber working under lack of oxidant, the fuel being introduced separately in relation to the oxidant into said chamber, and an additional introduction of oxidant at the level of a catalytic bed located downstream from said combustion chamber.

The invention further relates to the application of the process and/or the device to the production of methanol, ammonia, hydrocarbons, urea, acetic acid, hydrogen or a reducing gas.

BRIEF DESCRIPTION OF THE DRAWINGS

Other features and advantages of the invention will be clear from reading the description hereafter given by way of non limitative example, with reference to the accompanying drawings in which.

DESCRIPTION OF THE PREFERRED EMBODIMENTS

Figure 1:
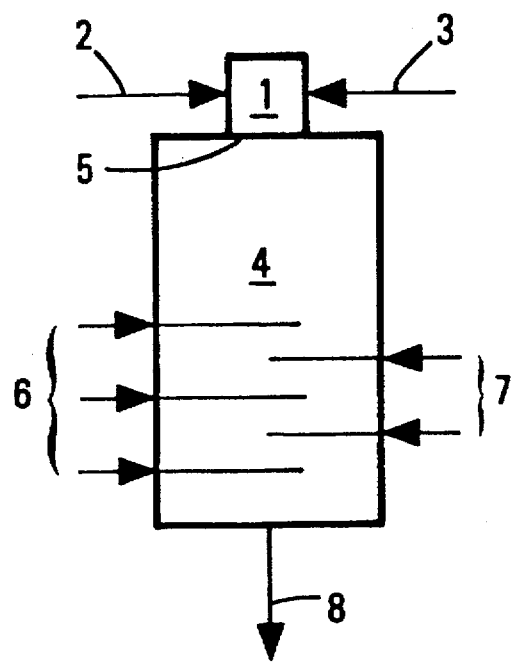
FIG. 1 is a simplified longitudinal section of a vertical type reactor according to the invention.
Figure 2:
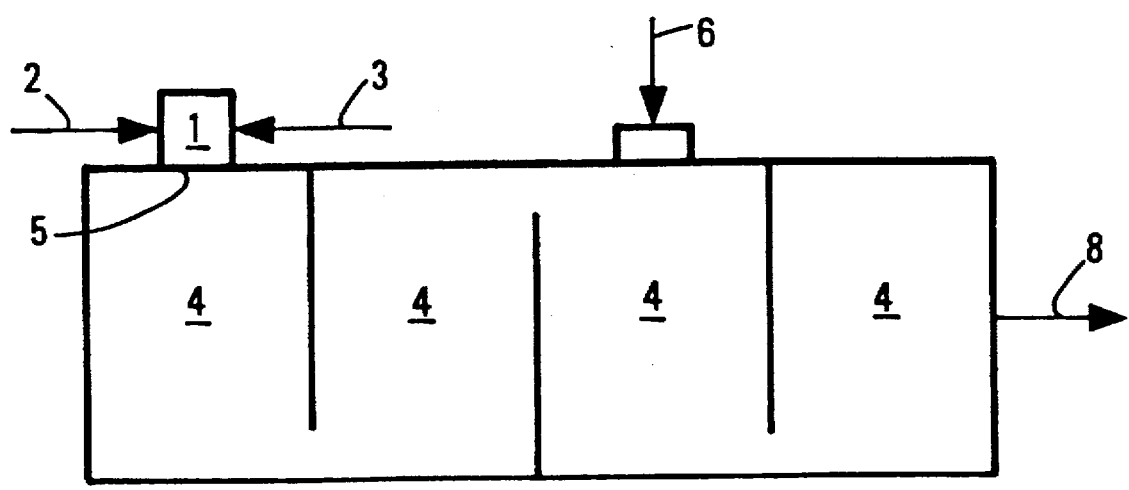
FIG. 2 is a simplified longitudinal section of a transverse type reactor according to the invention.

The same references will be used for the elements common to the two embodiments of the invention:

Thus, according to these figures, the reactor essentially consists of a combustion chamber 1 fitted with at least two distinct inlets, one 2 allowing the fuel to be introduced, the other 3 injecting the oxidizer which is an oxidant.

Injecting devices 2 and 3 do not only allow the fuel and the oxidizer to be introduced into said chamber 1, but also to stabilize the combustion therein.

A partial combustion takes place in combustion chamber 1 and the effluents resulting from this combustion run directly into the second part 4 of the reactor which is filled with at least one catalytic bed.

The second part 4 of the reactor, also called catalyst or catalytic bed hereafter, is part of the reactor since it shares a common surface 5 with combustion chamber 1. This surface is not necessarily horizontal.

The volume of combustion chamber 1 being rather limited, the combustion in this chamber is relatively confined. Therefore, in order to avoid any harmful effect on catalyst surface 5 in contact with the combustion chamber and particularly to protect this part against the impact of oxidizer and fuel jets, several solutions may be proposed:

- deposition of a protective layer made of a refractory material or of a catalytic material withstanding erosion, at the inlet of catalytic bed 4;
- axes of the jets coming from inlets 2 and 3 not perpendicular to the inlet plane of the catalyst.

Besides, catalytic bed 4 is fitted with at least one inlet 6 for the additional oxidant. In FIG. 1 for example, three injectors 6 are shown, which constitutes a particular embodiment of the invention.

The additional oxidant is thus introduced, according to the invention, in a zone 4 where the hydrocarbon concentration is low. As shown in FIG. 1, one or several fuel inlets 7 may be optionally provided in catalytic bed 4.

One or several outlets 8, located at the end of catalytic bed in relation to the direction of flow of the gases in the reactor, are of course provided.

Injectors of any type known in itself may be used for introducing the various constituents cited above.

The outline of the reactor according to the invention being defined, it is now necessary to clarify certain working conditions.

Combustion chamber 1 should allow to proceed with short residence times and under lack of oxidant.

One way of defining the short residence time may consist in imposing the following inequation:

$$V < 0.4 D/P$$

V being the volume of chamber 1, expressed in $m^3$

D being the overall weight flow entering chamber 1, expressed in kg/s, and

P being the predetermined operating pressure prevailing in chamber 1, expressed in megapascals.

As it is well-known by the man skilled in the art, and without considering the description hereafter to be limitative, the catalysts used according to the present invention consist of:

- a support based on oxides, with refractory properties and whose acidity has been neutralized,
- an active phase comprising 2 to 40%, preferably 3 to 30% by mass of at least one reducible metal M selected from nickel, cobalt, chromium, platinum metals. Taken separately, the proportion of platinum metals, if there are any, ranges between 0.01 and 1% by mass of the total cited above.

The support based on oxides comprises at least one simple or mixed oxide of the following list: alpha alumina; aluminate of spinel structure $NAl_2O_4$-$xAl_2O_3$ with x=0, 1, 2; at least one metal N selected from the following list: magnesium, calcium, strontium, barium, potassium; aluminate of magnetoplumbite (or hexaaluminate) structure $NAl_{12}O_{19}$; N being a metal of the list above.

Besides, these supports may be possibly promoted by at least one metal P selected from silicium, potassium, uranium.

In the most severe thermal conditions, for example with mean temperatures higher than 1000° C., preferably higher than 1100° C. and more preferably higher than 1200° C., it may be advantageous to arrange at the top an attack layer consisting for example of chromium oxide or of a low proportion of nickel deposited on one of the above-cited supports. This catalyst will protect the other catalyst located in the lower layer as described hereafter.

The catalysts used in the process according to the invention are prepared either by impregnation of the preformed support by a solution containing at least one metal M and possibly at least one metal P, drying and thermal activation; or by mixing of the precursors oxides of metals aluminum, M and N, possibly P, forming, drying and activation. Metal P, if used, may be added either before or after the forming stage.

Finally, they may also be prepared by coprecipitation or by the sol-gel process.

The catalysts used in the process according to the invention may exhibit the most varied geometries: pellets, balls, extrudates, annular pellets, ribbed rings, wheel-shaped catalysts from 3 to 30 mm. They may even be used in the form of monoliths, consisting either of the oxides and/or the metals corresponding to the metallic elements cited above, or of refractory material monoliths coated with said elements. One or several monoliths may be present.

It goes without saying that, according to the operating conditions, the charge used, the local composition, the presence or not of steam, the level of the risk of carbon deposition, such or such formula will be used. Thus, the catalysts promoted by potassium or strontium, or by potassium plus calcium, or else calcium will be preferably used when the risk of carbon deposition is the highest.

The present invention is preferably achieved in the presence of at least one catalyst allowing the selective activation of the wanted reaction processes, that is to:

1) selectively convert the methane and, if they are also present, the higher hydrocarbons, by direct or indirect reaction with the oxygen and/or the steam present, to carbon oxides and hydrogen,
2) activate the other wanted reaction processes and notably the conversion of the coke precursors, according to the reaction:

3) allow to limit disproportionation reactions of CO

by removal of the carbon formed, as above;

4) if CO2 is at least partly recycled, activate selectively the reaction:

$CH_4 + CO_2 \rightleftharpoons 2CO + 2H_2$.

The catalysts known by the man skilled in the art and used equally in steam reforming, secondary reforming and partial catalytic oxidation processes are suitable on several accounts for the embodiment of the invention. It is however preferable that the catalysts used have a good thermal stability (for example up to at least 900° C. and preferably at least 1000° C.).

Besides, these catalysts may be arranged in one or several beds, laid out as described above and possibly separated by one or several devices (6, 7) for injecting one or several gaseous compounds such as those described above.

The volumetric velocity per hour (VVH) with respect to hydrocarbon and expressed in NTP volumes of hydrocarbon per hour and per volume of catalyst may be expressed in corrected VVH. If m is the average number of atoms of carbon of the charge, the corrected VVH (which will be that used in the process of the invention) is:

corrected VVH=VVH×m.

A corrected VVH ranging between 200 and 10,000 $h^{-1}$, preferably between 400 and 8000, and more preferably between 500 and 7000 hours $^{-1}$ is used.

It is obvious, for the man skilled in the art, that the catalyst bed can be parted in n beds of volumes $V_1, V_2, \ldots V_i \ldots V_n$, such that $V_1+V_2+\ldots +V_i+V_n=v$, the VVH being expressed in relation to the overall catalyst volume v.

The fuel introduced through inlet or inlets 2 of the combustion chamber or possibly through inlets 7 will preferably consist of hydrocarbons (natural gas or methane for example) admixed with carbon oxides (CO, $CO_2$) and/or hydrogen and/or inert gases.

Steam may also be admixed with the hydrocarbons, in a proportion defined hereafter.

The proportion of hydrogen in the hydrocarbons is such that the $H_2$/hydrocarbons ratio is less than 1.

The composition of the gases injected at the various inlets is not necessarily identical.

The oxidant introduced at the level of inlet 3 may be pure oxygen, a mixture of oxygen and nitrogen, air, a mixture of oxygen and steam, a mixture of oxygen and carbon dioxide, a mixture of oxygen and another inert gas.

The overall supply of steam and carbon dioxide remains low with respect to certain other technologies of the prior art cited above. In fact, a molar ratio $$K = \frac{H_2O + CO_2}{\Sigma C} < 1.5$$

will be preferably used, where $\Sigma C$ is the total carbon comprised in the hydrocarbons, and ($H_2O+CO_2$) is the sum of the flow rates of water and $CO_2$ injected. By way of comparison, the same molar ratio for a conventional autothermic reactor would be higher than 2.

Staging the introduction of oxidant according to the invention allows to limit the temperature peaks inherent in the reaction between the fuel and the oxidant. In fact, a single oxidant inlet would inevitably lead to a strong exothermicity and to a subsequent decrease in the performances and/or in the life of the catalyst.

This exothermicity thus leads, in conventional autothermic reactors having a single oxygen inlet, to dilute the oxidant with a high proportion of steam.

Having several oxidant inlets according to the invention allows to modulate the composition of the oxidant at the various stages and therefore to better control the reaction.

For example, for the synthesis of ammonia, if the stoichiometry $N_2+3H_2$ is wanted, air will be preferably introduced into combustion chamber 1 (inlet 3) and pure oxygen, possibly admixed with steam, will be preferably introduced at the level of the catalytic bed through inlet or inlets 6.

Preheating is recommended, both for the fuel and the oxidant, before the introduction thereof into the reactor. The fuel may be preferably preheated between 100° and 850° C., and the oxidant may be preheated between 100° and 900° C. More precisely, temperatures ranging between 200° and 750° C. are preferable.

The pressure in combustion chamber 1 ranges between 1 and 150 bars, preferably between 30 and 100 bars.

The significance of the present invention will be clear from comparing the examples hereafter. Examples 1 and 2 give results of the prior art whereas examples 3 to 5 present embodiments of the invention. In all the examples hereunder, the reactor receives natural gas containing 98.7% of methane, 0.9% of ethane and 0.4% of nitrogen.

EXAMPLE 1

The oxidant is air, the wanted application is the synthesis of ammonia. The natural gas is preheated at 545° C. The air is preheated at 706° C. The reactor comprises no stage structure. The total air, natural gas and steam run into the combustion chamber. The pressure therein is 3.95 megapascals.

In this example, VP/D is 0.09. V, P and D are respectively the volume, pressure and flow rate defined above. The respective flow rates of gas, air and steam are such that the $O_2/C$ ratio is 0.55 and the $H_2O/C$ ratio is 1.20.

In the combustion chamber, the gases are brought to a temperature of 1260° C. This chamber ensures 60% of the conversion of the hydrocarbons.

The VVH of the catalytic bed is 6400 $h^{-1}$. At the top of the bed, 25% of the volume consists of a ring-shaped catalyst containing 4% of chromium deposited on alpha alumina.

The remaining 75% volume consists of a ring-shaped catalyst containing 10% of nickel deposited on alpha alumina.

The effluents leave the reactor at 960° C. with 0.8% of residual methane and less than 2 mg/Nm³ of soots.

In an industrial embodiment according to this example, the excess nitrogen would be separated before the ammonia loop.

During this pilot test, while keeping the preheating and the air and gas flow rates, it has been possible to bring the $H_2O/C$ ratio down to 1.00. Below this value, the catalytic bed is obstructed by soot.

EXAMPLE 2

The same catalyst distribution as in example 1 is used, but the catalyst containing nickel on refractory alumina is replaced by a ring-shaped catalyst containing 10% of nickel deposited on magnesium aluminate $MgAl_2O_4xAl_2O_3$,(x=1).

It is then possible to proceed with a $H_2O/C$ ratio of 0.95. The temperature in the combustion chamber is 1275° C. At the reactor outlet, there is less than 2 mg/Nm³ of soot.

EXAMPLE 3

It appeared that, in order to keep the proportion of soots lower than 2 mg/Nm³, it was necessary to increase progressively the $H_2O/C$ ratio.

This is the reason why we designed the stage reactor according to the present invention.

The preheating conditions of the gases have been kept, but the air is brought to 730° C.

The air inlet is divided in two: combustion chamber 1 only receives a $O_2/C$ ratio of 0.35, although the overall ratio is still 0.55. The proportion of steam is only 0.60.

These conditions have allowed the partial combustion of methane in chamber 1 to be carried out at 1165° C., but the hydrocarbon conversion is only 38%.

The first catalytic bed, which represents 40% of the overall volume, consists of a commercial ring-shaped catalyst containing 16% of nickel deposited on an industrial support made of calcium aluminates.

After passing through this first catalytic part, the effluents reach 870° C. with 8% of residual methane.

The volume composition thereof is:

$H_2$:33%, $N_2$:31%, CO:12%, $CO_2$:4%, $H_2O$:12%.

They enter thereafter a layer of chromium catalyst (4% Cr) on a refractory alumina support, the layer being crossed through by refractory pipes pierced with 1-mm openings. The air complement, preheated at 653° C., is introduced through these pipes ($O_2/C$=0.2).

The temperature rises again up to a value ranging between 1190° and 1210° C.

This chromium bed representing 10% of the overall volume is followed by a catalyst bed made of nickel on a refractory alumina support (10% of nickel).

At the reactor outlet, there is only 1% of residual methane in the effluents at 995° C.

The outlet composition is:

33.8% $H_2$, 37.3% $N_2$, 14.2% CO, steam and carbon dioxide.

The proportion of soot remains lower than 2 mg/Nm$^3$.

EXAMPLE 4

The conditions are the same as in example 3. The difference lies in the fact that the commercial catalyst with 16% of nickel on calcium aluminate has been replaced by a catalyst containing 12% of nickel deposited on barium and strontium aluminate of formula $Ba_{0.5}Sr_{0.5}Al_{12}O_{19}$ and of specific surface 10 m$^2$ g$^{-1}$ (measured with the BET method). The soot is not measurable.

EXAMPLE 5

In this example, the autothermic conversion is achieved with pure oxygen, which allows to produce a synthesis gas containing no significant amount of nitrogen, intended for the FISCHER and TROPSCH synthesis.

In this example, $CO_2$ is recycled in the synthesis gas reactor. The latter comprises one stage. Combustion chamber 1, at the reactor head, receives natural gas, oxygen and steam. The gas and the oxidant are preheated at 550° C.

The $O_2/C$ and $H_2O/C$ molar ratios introduced in the combustion chamber are respectively 0.30 and 0.50. The pressure in the chamber is 4 megapascals.

The overall weight flow in the room and volume of the latter are such that VP/D=0.15 in this example The combustion products are at 1160° C. in the chamber.

They run into a first ring-shaped catalyst layer containing 1% of calcium and 3% of chromium deposited on alpha alumina, which represents 10% of the overall catalyst volume v.

This catalyst is followed by a commercial catalyst containing 9% of nickel deposited on a refractory alumina support which represents 40% of the overall catalyst volume v.

At the outlet of the nickel-based catalyst bed, the effluents are only at 880° C. and still contain 18% of methane. They enter then a third catalyst layer in which ceramized tubes pierced with openings of 1.2-mm diameter open. This catalyst is identical, in nature and volume, to the first bed.

A mixture of oxygen, steam and carbon dioxide in a ratio 0.357-0.357-0.286, preheated at 580° C., is introduced through these tubes. The flow rate allows the $O_2/C$ ratio to be brought to 0.55. The oxidation produced can then cause the temperature to raise locally up to 1250° C. The gaseous mixture meets a fourth commercial catalyst containing 14% of nickel, 2% of potassium oxide $K_2O$ deposited on alpha alumina. The charged volume corresponds to 40% of the overall catalyst volume v.

At the outlet of the reactor, the effluents are at 1010° C., with 1.6% of residual methane. The $H_2/CO$ ratio therein is 2.00. No soots are detected in the synthesis gas produced thereby.

Other modifications and/or additions may be provided by the man skilled in the art to the plant and the implementing thereof which have been described, without departing from the scope of the invention.

We claim:

1. A synthesis gas reactor comprising a single housing; a non-catalytic combustion chamber located within said single housing and equipped with at least one injecting means for injecting fuel and at least one injecting means for injecting an oxidizer to achieve partial combustion of the fuel within said chamber; and at least one catalytic bed, separate from the combustion chamber, located within said housing into which gases from the combustion chamber discharge; said at least one catalytic bed being equipped with at least one injector for injecting additional oxidizer into said bed; the combustion chamber having a short residence time for the fuel and oxidizer and having a volume which satisfies the following inequality:

$V<0.4D/P$ wherein V is the inner volume of said chamber, expressed in m$^3$, D is the overall weight flow rate of reactants entering the chamber, expressed in kg/s, and P is the pressure, expressed in megapascals, prevailing inside the chamber.

2. A reactor as claimed in claim 1 further comprising at least one additional injector positioned at a level of the catalytic bed for introducing additional fuel into a portion of the catalytic bed.

3. A reactor as claimed in claim 1, wherein the fuel introduced into the combustion chamber comprises hydrocarbons or hydrocarbons mixed with carbon oxides and/or hydrogen, said fuel being supplied from a source connected to the means for injecting fuel located outside of said single housing.

4. A reactor as claimed in claim 3, wherein the hydrogen/hydrocarbon ratio, defined as being the molar ratio expressed in number of moles of hydrogen to the number of moles of carbon in the fuel introduced into the combustion chamber is less than 1.

5. A reactor as claimed in claim 1, wherein the oxidizer comprises pure oxygen, a mixture of oxygen and nitrogen, a mixture of oxygen and carbon dioxide or a mixture of oxygen and another inert gas, said oxidizer being supplied from a source located outside of said single housing connected to the means for injecting oxidizer.

6. A reactor as claimed in claim 1, wherein the injecting means for introducing the oxidizer and/or the fuel into the combustion chamber may also introduce steam into the combustion chamber from a source of steam connected to the injecting means.

7. A reactor as claimed in claim 1 further comprising means for preheating the fuel before the fuel is introduced into the combustion chamber to temperatures between 100° and 850° C., said preheating means being located upstream from the means for injecting fuel into the combustion chamber, and means for preheating the oxidizer to temperatures between 100° and 900° C. located upstream from the means for injecting oxidizer into said combustion chamber.

8. A reactor as claimed in claim 5, wherein the oxidizer supply, defined as being the number of moles of oxygen contained in the oxidizer injected into the reactor to the number of moles of carbon contained in the injected fuel ranges between 0.3 and 0.65, and wherein the same supply relative to the introduction of oxidizer in said combustion chamber ranges between 0.15 and 0.5.

9. A reactor as claimed in claim 1 further comprising means for supplying steam to the reactor together with the oxidizer and/or the fuel, the supply of steam being defined as the number of moles of water to the number of moles of carbon in the fuel and being less than 1.5.

* * * * *